Patented Mar. 13, 1951

2,544,698

UNITED STATES PATENT OFFICE 2,544,698

POULTRY FATTENING COMPOSITION

Frederick W. Lorenz, Davis, Calif., and Clarence W. Sondern, Mendham, N. J., assignors to White Laboratories, Incorporated, Newark, N. J., a corporation of New Jersey No Drawing. Application January 4, 1947, Serial No. 720,316

8 Claims. (Cl. 99—4)

This invention relates to a composition for feeding poultry, particularly to a feeding composition effective in promoting fattening of poultry.

There has long been felt a need for a poultry feeding composition which would enable one to increase fat deposition in a bird and to improve skin texture or, in terms used in the industry, to improve the "finish" of a fowl so as to enhance its marketability over than usually attained by feeding normal balanced rations. In attempting to develop a feeding ration for poultry which would accomplish this purpose, synthetic substances having biological effects like those of the estrogenic hormones, e. g., diethylstilbestrol, and hexestrol, have been incorporated in feeding mixtures but without substantial success. Although in some instances a slight increase in the fat deposition has been noted when such substances have been administered orally, this increase has invariably been so small as to be without commercial significance or has required prohibitively large quantities to produce a moderate increase in fat deposition.

It has now been found that, contrary to expectations, dienestrol (3,4-bis(p-hydroxyphenyl)-2,4-hexadiene) and certain compounds related chemically thereto, and herein referred to as lipogenous substances or compounds, are effective when incorporated in small amounts in the feeding rations of chickens and other poultry, not only in suppressing the sexual characteristics of male individuals, but also as agents for increasing the rate of fattening of both male and female individuals substantially over the rate of fattening observed when feeding a ration similar in every respect except for the omission of the novel agents. The lipogenous compounds which have been found effective are dienestrol and diesters thereof with fatty acids containing less than 11 carbon atoms such as dienestrol diacetate, dienestrol dipropionate, dienestrol dibutyrate, dienestrol dicaprylate, dienestrol diisobutyrate, dienestrol dipelargonate, and dienestrol dicaprate. A preferred composition contains dienestrol or diesters thereof with straight chain fatty acids containing less than 5 carbon atoms, such compounds being prepared easily and economically from acids which are readily available.

The activity of these compounds in promoting a more rapid fattening of the fowl is not to be expected from their relative effectiveness in producing the rise in blood fat level in fowl that follows administration of estrogenic substances to this species.

The fattening composition of the invention may be prepared readily by dispersing or mixing the lipogenous compound with any otherwise desirable feeding composition for poultry. The lipogenous substance is incorporated in the feed in any desired amount less than about 300 milligrams per kilogram of feed. When less than about 10 milligrams of the substance is used per kilogram of feed the lipogenous effect, although noticeable, it not as great as is usually desired. When more than about 250 to 300 milligrams of the lipogenous substance is used per kilogram of feed the cost of the agent becomes excessively high. Suitable proportions for commercial use have been found to be from about 10 to about 100 milligrams of the lipogenous substances per kilogram of feed. Mixtures of lipogeneous substances may be used, if desired.

Lipogenous substance may be incorporated in the feed mixture in any convenient manner, such as by dissolving the substance in a solvent, preferably a non-toxic solvent such as a vegetable or animal oil, e. g., cottonseed oil, corn oil, fish liver oil, sardine oil, and the like, and spraying the solution over the feed while it is being stirred, or by mixing the solid lipogenous substance directly with the solid feed. In the latter instance effective mixing is promoted by first mixing the lipogenous substance in finely powdered form with several times its weight of a finely powdered diluent and then incorporating the mixture in the feed material. In this way the difficulty of mixing thoroughly a very small amount of one solid substance with a relatively large amount of another solid substance is overcome. Obviously the diluent used should not be harmful to the fowl eating the final mixture and it may, if desired, be an advantageous constituent of the final feeding composition. In the case of feeds which are prepared by heating or cooking, the lipogenous substance may be incorporated in the feed mixture either before or after heating.

Certain advantages of the invention are apparent from the following example which is given by way of illustration only and is not to be construed as limiting.

Example

A balanced ration for chickens was prepared containing yellow corn meal, ground oats, wheat middlings, wheat bran, dehydrated alfalfa meal, soybean oil meal, fish meal, meat scrap, dried whey, riboflavin supplement, ground limestone, iodized salt, manganese sulphate and fish oil containing vitamins A and D.

In one portion of the mixture there was incorporated 100 milligrams per kilogram of feed of dienestrol diacetate. In a second portion of the mixture there was incorporated 33 milligrams per kilogram of feed of dienestrol diacetate and in a third portion there was incorporated 33 milligrams of dienestrol per kilogram of feed.

The incorporation of the lipogenous substances in the feed mixture was carried out in several different ways. In some instances, 3.3 grams of a one per cent solution of lipogenous substance in corn oil per kilogram of feed was added by spraying on the feed mixture while the latter was being mixed. The feed mixture was stirred until uniform distribution of the lipogenous substance therein was obtained. In other instances, the crystalline lipogenous substance was mixed with soybean oil meal prior to the compounding of the feed mixture.

The mixtures containing the lipogenous substances as described above, and a portion of the mixture containing no lipogenous substance, were fed to separate lots of six weeks old cockerels for a period of six weeks. The birds received no other food during the period of the test. At the end of the feeding period the birds were killed and autopsied. The abdominal adipose tissue weight was used as a measure of the fattening action of the treatment. In each instance the weight of abdominal adipose tissue of the birds which had been fed with a feed mixture containing a lipogenous substance was from two to four times that of the weight of abdominal adipose tissue of the birds which had been fed on the same feed mixture but without the addition thereto of a lipogenous substance.

Similar results were obtained using two weeks old pullets and cockerels and feeding at levels of 10 and 33 milligrams of lipogenous substance per kilogram of feed for a period of 10 weeks.

Similar results are also obtained using dienestrol dipelargonate and dienestrol dipropionate.

We claim:

1. A feeding composition for fattening poultry which includes a compound selected from the group consisting of dienestrol and diesters thereof with fatty acids containing less than 11 carbon atoms in the molecule.

2. A feeding composition for fattening poultry which includes a compound selected from the group consisting of dienestrol and diesters thereof with fatty acids containing less than 11 carbon atoms in the molecule in an amount less than about 300 milligrams per kilogram of feed.

3. A composition as claimed in claim 2 wherein the said compound is present in an amount of from about 10 to about 100 milligrams per kilogram of feed.

4. A feeding composition for fattening poultry which includes a compound selected from the group consisting of dienestrol and diesters thereof with straight chain fatty acids containing less than 5 carbon atoms in the molecule in an amount less than about 300 milligrams per kilogram of feed.

5. A feeding composition for fattening poultry which includes dienestrol diacetate in an amount not to exceed about 300 milligrams per kilogram of feed.

6. A feeding composition for fattening poultry which includes from about 10 to about 100 milligrams of dienestrol diacetate per kilogram of feed.

7. A feeding composition for fattening poultry which includes dienestrol dipropionate in an amount not to exceed about 300 milligrams per kilogram of feed.

8. A feeding composition for fattening poultry which includes from about 10 to about 100 milligrams of dienestrol dipropionate per kilogram of feed.

FREDERICK W. LORENZ.
CLARENCE W. SONDERN.

REFERENCES CITED

The following references are of record in the file of this patent:

"Artificial Induction of Lactation in Bovines by Oral Administration of Synthetic Oestrogens," by Folley et al., 1943, Published in Journal of Endocrinology, vol. 4, 1944, pages 23 to 36.

Chem. Abstracts, vol. 40, 1946, page 1573.

Annual Review of Biochemistry, 1942, vol. XI, pp. 524 and 525.

Chemical Abstracts 1946, vol. 40, page 1957².

Chemical abstracts 1945, vol. 39, pages 1638⁸, 2122³, 2120⁵.

Chemical Abstracts 1944, vol. 38, pages 5897³, 1579⁹.